United States Patent [19]
Gupta et al.

[11] Patent Number: 5,430,713
[45] Date of Patent: Jul. 4, 1995

[54] FREQUENCY HOPPING IN DIGITAL CELLULAR NETWORKS

[75] Inventors: Pavan K. Gupta, Chatham; Mozammil Hussain, Dover; Desmond A. Lee, Hillsborough Township, Somerset County; Haim S. Ner, Fair Lawn, all of N.J.

[73] Assignee: AT&T Corp., Murray Hill, N.J.

[21] Appl. No.: 239,053

[22] Filed: May 6, 1994

[51] Int. Cl.6 .............................. H04J 4/00; H04L 5/26
[52] U.S. Cl. ......................................... 370/50; 370/95.3
[58] Field of Search ................. 370/50, 85.1, 85.2, 370/85.3, 85.7, 95.1, 95.3, 121, 124; 379/59, 63; 455/33.1, 103, 104

[56] References Cited
U.S. PATENT DOCUMENTS

| | | | |
|---|---|---|---|
| 5,022,024 | 6/1991 | Paneth et al. | 370/50 |
| 5,311,504 | 5/1994 | Colamonico et al. | 370/50 |
| 5,329,548 | 7/1994 | Borg | 370/50 X |

Primary Examiner—Melvin Marcelo
Attorney, Agent, or Firm—Lester H. Birnbaum

[57] ABSTRACT

A circuit is for providing frequency hopping in a Time Division Multiple Access (TDMA) system. A microprocessor determines the frequency to be transmitted in a particular broadcast frame. A dual port random access member (RAM) provides an interface between the microprocessor and a time division multiplex bus so that the time slots are mapped to addresses in the memory. A plurality of transceivers coupled to the bus transmits and receives at different designated frequencies, the transceivers being chosen for particular users during a particular broadcast frame based on the location in the memory chosen by the microprocessor.

6 Claims, 5 Drawing Sheets

FREQUENCY HOPPING IN DIGITAL CELLULAR NETWORKS

BACKGROUND OF THE INVENTION

This application relates to Time Division Multiple Access (MA) systems.

In a typical TDMA system for mobile phone applications, the cellular base station includes radio channel unit that transmit to add receive from a plurality of users. Therefore, each unit will transmit and receive an "air" or "broadcast" frame comprising multiple time slots. h the AT&T Intelliverse$^{TM}$ system supposing GSM stands, the radio channel unit are divided into a channel control unit and a plurality of transceivers which are coupled together by a transmit-receive (TRX) bus. Each transceiver typically serves eight users, and an add frame includes eight time slots.

In both systems, it may be necessary to verify the frequency for trasmission and reception between the base station and a particular user, also down to the industry as "frequency hopping". Thus, a decision is made by the radio channel unit or channel control unit before each frame is transmitted as to which frequency should be utilized for a particular user. If the frequency vibration is implemented at the radio frequency (RF) stage in the transceivers, fast frequency synthesizers are needed since a time slot in an air flame is typically only 577 microseconds for GSM systems. Use of such synthesizers tends to be expensive.

It would be more economical to implement the frequency changes at the baseband stage of the be station.

SUMMARY OF THE INVENTION

The invention is a circuit for varying the carrier frequencies of transmission and reception of messages in a Time Division Multiple Access system at a baseband signal stage. The circuit includes means for determining the carrier frequency for transmission and reception of messages in a particular broadcast frame and for designating time slots for said messages according to frequency. A bus is provided for transmission and reception of messages in the designated time slots time division multiplexed frames. A dual port random access memory has one port coupled to the frequency determining means and another port coupled to the bus so as to store therein said messages at locations corresponding to the designated time slots. A plurality of transceivers is coupled m the bus, each transceiver adapted to transmit and receive on a single carrier frequency messages assigned to specific time slots corresponding to that transceiver.

BRIEF DESCRIPTION OF THE DRAWING

These and other features of the invention are delineated in detail in the following description. In the drawing.

DETAILED DESCRIPTION

Figure 1:
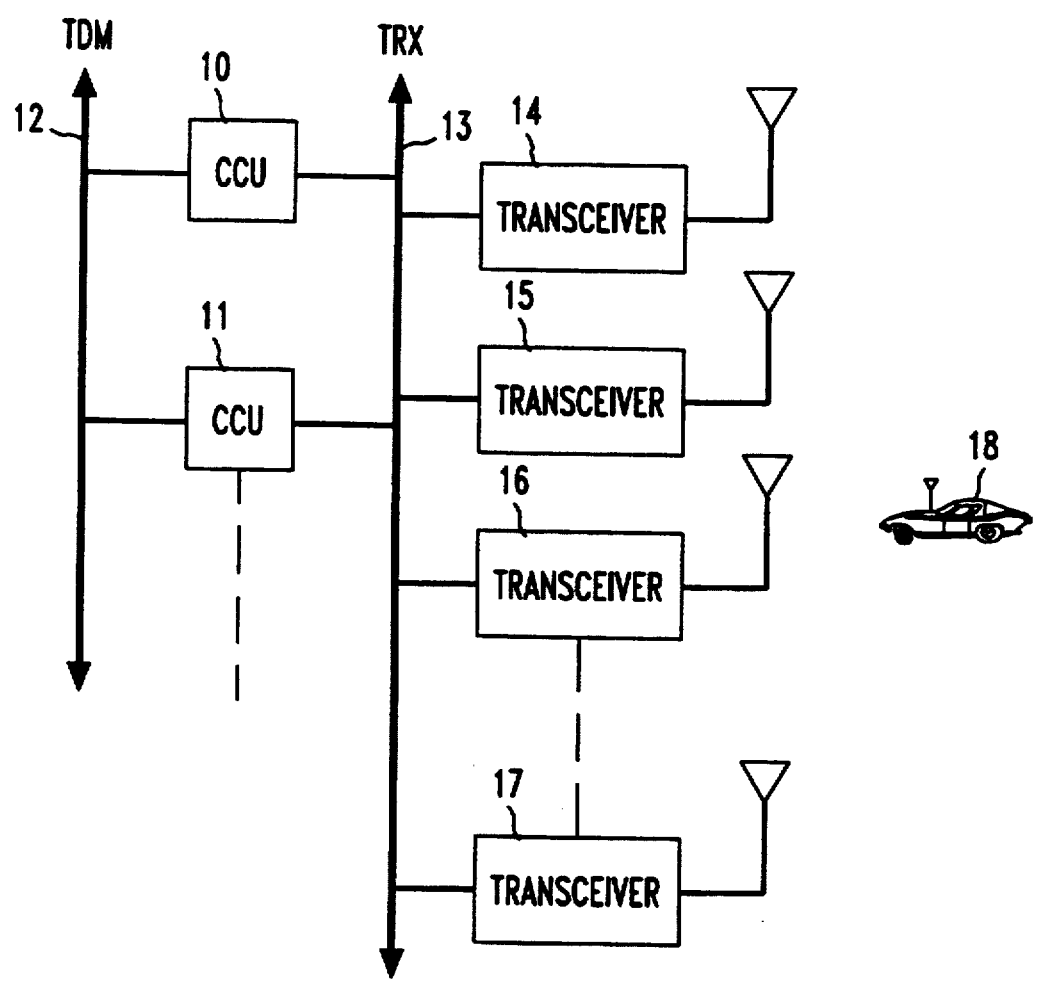
FIG. 1 is a schematic block diagram of a portion of a prior art system which can utilize the invention in accordance with one embodiment.

FIG. 1 illustrates a Standard Global System for Mobile Communications (GSM) system for radio transmission as implemented by an AT&T Intelliverse$^{TM}$ system. Channel control units (CCU), two of which are shown as 10 and 11, are coupled between a time division multiplex (TDM) bus, 12, and a transmit-receive (TRX) bus, 13. Also coupled to the TRX bus 13 is a plurality of transceivers, four of which are shown as 14-17. In a typical system, each transceiver, e.g., 14, will transmit radio frequency (RF) signals to and receive RF signals from a number of mobile end users, e.g., 18. Typically, eight time division multiplexed signals are transmitted in a single broadcast frame so that eight users could be served by a single transceiver. The channel control unit, e.g., 10, will determine what frequency to be used for each user in each frame and direct baseband signals to the appropriate transceiver adapted to the desired frequency.

Figure 2:
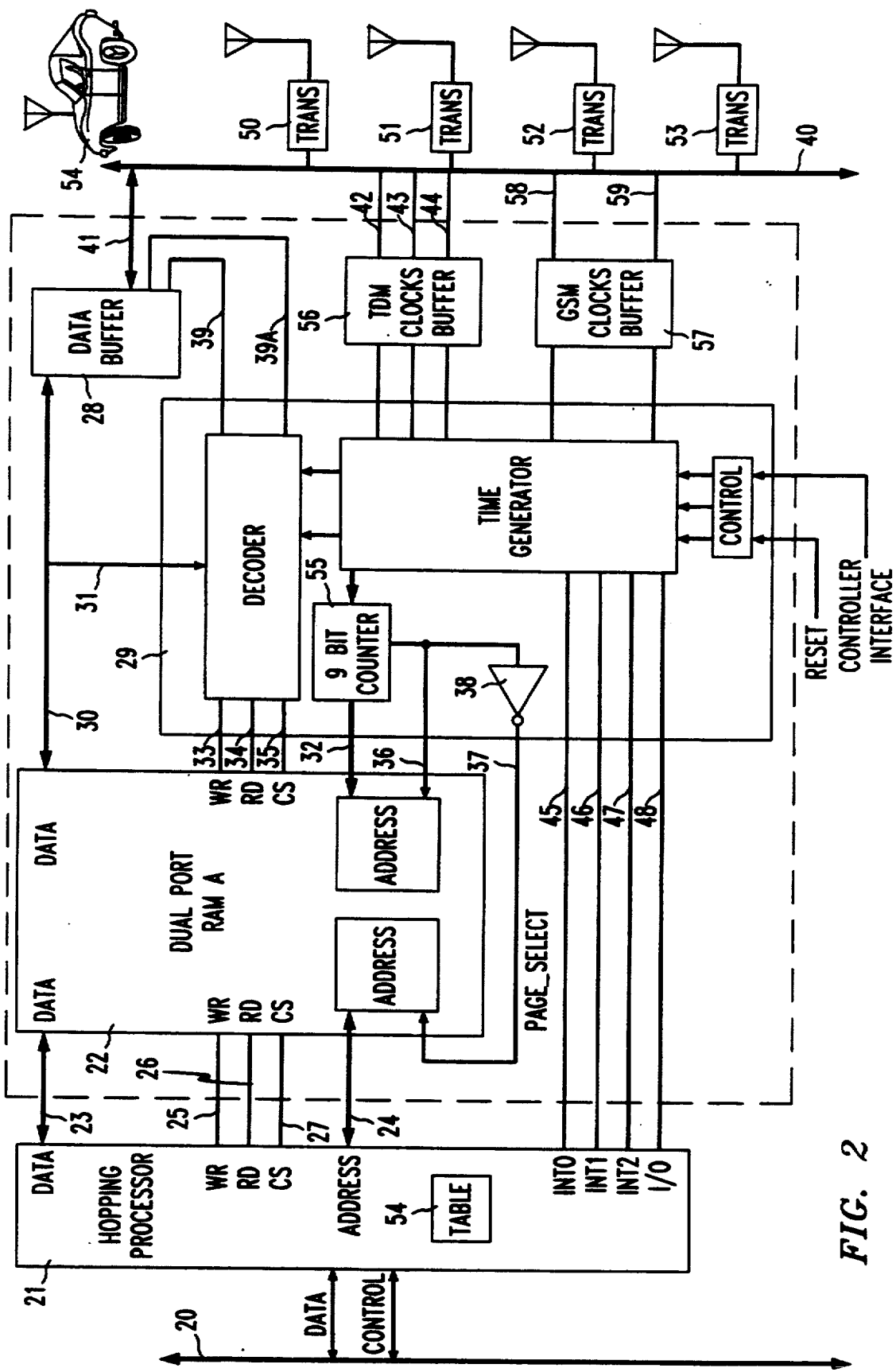
FIG. 2 is a schematic block diagram of a circuit in accordance with one embodiment of the invention.

FIG. 2 illustrates a circuit in accordance with the invention which performs the frequency hopping function in the baseband portion of the base station, rather than in the RF (transceiver) portion. Coupled to the TDNI bus 20 through standard base station circuitry (not shown) is a fast microprocessor such as a digital signal processor (DSP), 21, for determining the frequency to be transmitted and received between the station and the end users in any particular broadcast frame. This "hopping" DSP also includes a table (54) for matching the calculated frequencies with time slots in time division multiplexed frames on bus 40. The "hopping" DSP is coupled to one port of a dual port random access memory (DPRAM) 22. Specifically, data will be transmitted between the DSP 21 and DPRAM 22 on lead 23, while the DPRAM will be addressed by the DSP on lead 24. A request to write will be transmitted on lead 25, and a request to read the memory will be transmitted on lead 26. The selection of the particular memory 22 shown is provided on lead 27.

The other port of DPRAM 22 is coupled to a buffer circuit 28 and to a time generator and decoder circuit 29. Specifically, data is transmitted between the DPRAM 22 and buffer 28 on lead 30, while a portion of the data is transmitted to time generator and decoder circuit 29 on lead 31. The DPRAM is addressed by time generator and decoder circuit 29 on lead 32. Write, read and chip select requests are transmitted by the time generator and decoder circuit 29 on leads 33, 34 and 35, respectively. A lead 36 is also coupled between the time generator and decoder circuit 29 and the DPRAM, while a lead 37 is coupled from the time generator and decoder circuit 29, through an inverter 38, to the port of the DPTLAAVI coupled to the hopping DSP 21. The time generator and decoder circuit 29 is also coupled to the buffer 28 by means of leads 39 and 39a. The time generator and decoder circuit 29 also includes a counter, 55, which is coupled through the time generator to a TRX clock buffer 56 and, ultimately, to clock leads 43 and 44 and to lead 42 which transmits frame signals. The counter is also coupled to address lead 32.

Data is transmitted bidirectionally between the buffer 28 and TRX bus 40 on lead 41. The time generator and decoder circuit 29 is also coupled to the TRX bus through a GSM clock buffer 57, lead 58 which transmits broadcast frame signals, and lead 59 which transmits time slot signals. The unit 29 is further coupled to the hopping DSP 21 by leads 45-48.

A plurality of transceivers, four of which are shown as 50-53, are also coupled to the TRX bus. Each transceiver, e.g., 50, is adapted to transmit and receive RF signals between the base station and a multiplicity of users (typically eight), e.g., 54. Each transceiver is tuned to a single frequency.

Figure 3:
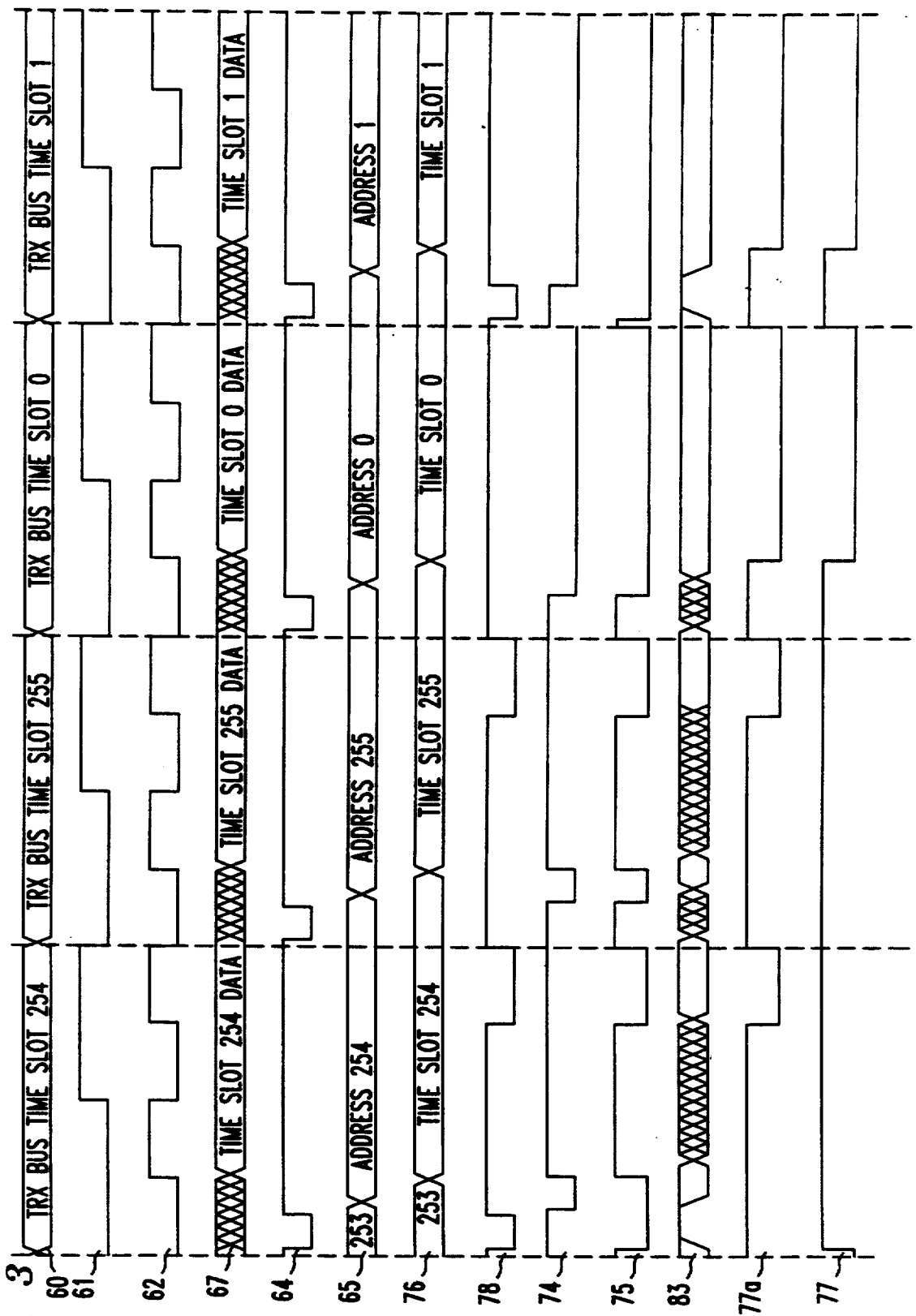
FIGS. 3-5 are waveform diagrams for the circuit of FIG. 2.
Figure 4:
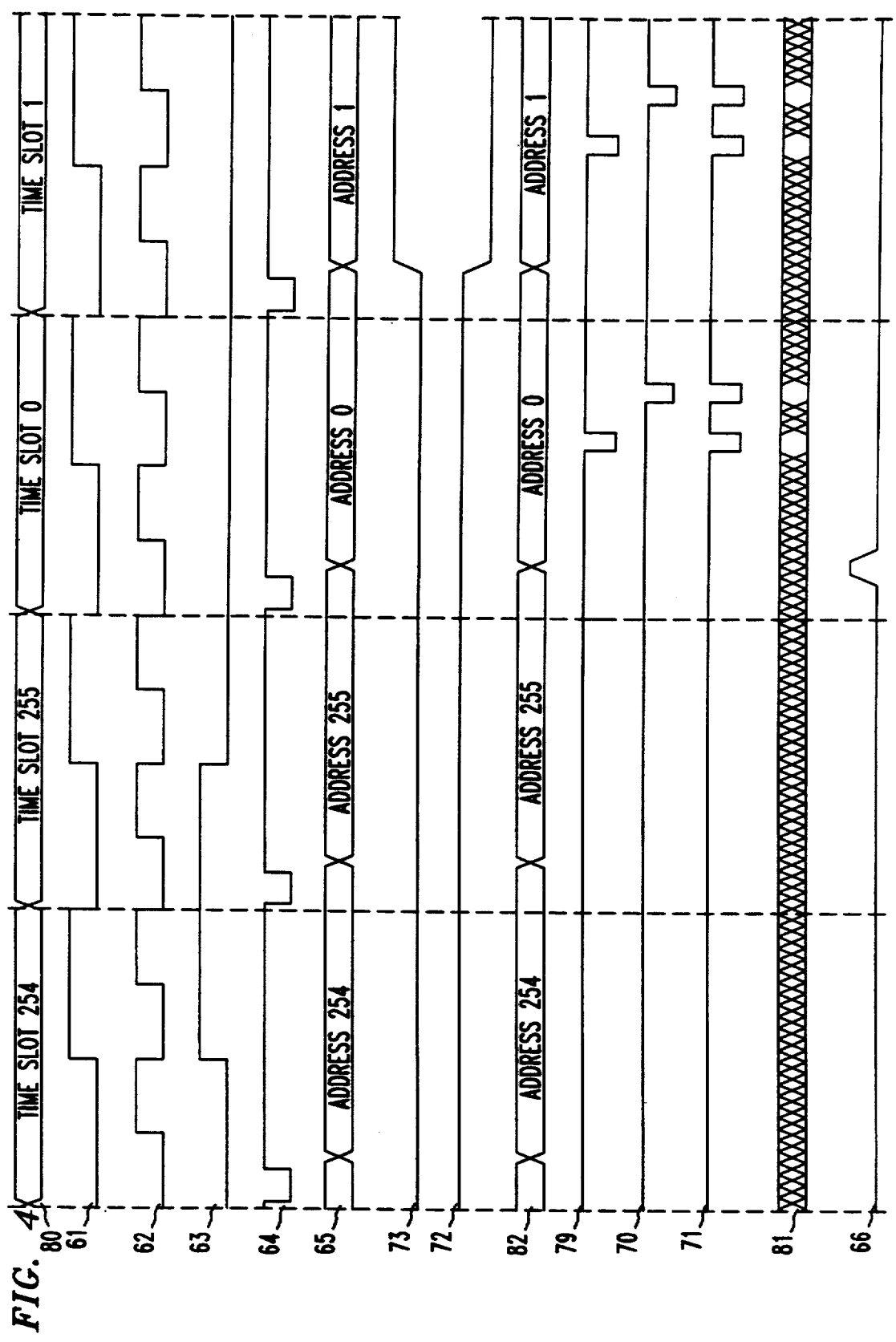

The operation of the circuit of FIG. 2 will now be described with further reference to the waveform diagrams of FIGS. 3 and 4 which illustrate signals relevant to the operation of the circuit 29 and DSP 21, respectively. A sequence of specific time division multiplexed time slots (in this example time slots 254, 255, zero and 1) is illustrated by waveform 60 of FIG. 3 and a sequelace of specific time slots (also 254 to 1) is illustrated by waveform 80 of FIG. 4. Both FIGS. 3 and 4 show clock signals 61 and 62 which are received by circuit 29 from the TRX bus 40 on leads 43 and 44. As illustrated, the clock signal 62 is twice the frequency of clock signal 61, the latter typically being approximately 1.997 MHz with a period of 500.8 nanoseconds. Thus, each complete cycle of signal 61 defines a time slot on the TRX bus. Typically, there will be 256 time slots in each time division multiplexed frame on the bus 40, as distinguished from the eight time slots broadcast in a frame by each transceiver 50–53. Waveform 63 comprises the TRX frame signal which is transmitted to the time generator and decoder circuit 29 on lead 42 (see FIG. 4). The frame signal, when high, alerts the hardware to the coming of a new time multiplexed frame (time slot O).

Waveform 64 represents the "address" clock which the time generator and decoder circuit 29 generates from the incoming clock signals. 61 and 62 and applies to the counter 55. It will be noted that the address clock signal 64 will go low at the start of each TRX bus time slot (defined by clock signals 61 and 62 being low). The rising edge of the signal 64 will define a new address which is equal to the time slot number address as illustrated by waveform 65 and is coupled to the dual port RAM 22 on path 32. Waveform 66 (see FIG. 4) is sent to the hopping DSP 21 on lead 45 to indicate to the DSP that a new TRX frame (time slot 0) has begun.

As known in the art, the hopping DSP 21, employs a standard algorithm for calculating what frequency should be broadcast to any particular user in any particular broadcast frame. Further, the DSP also includes a table, 54, allocating each possible frequency to particular TRX time slots on the TRX bus 40. Since each time slot is allocated a particular address in the DPRAM 22, the table 54 also indicates to the hopping DSP 21 which location in the memory to send a message to a particular user once the frequency has been calculated by the DSP.

Thus, after receiving an indication of the start of a new frame (waveform 66), the hopping DSP will write into DPRAM the messages to the appropriate addresses according to the calculated frequencies..

As illustrated by the timing diagram of FIG. 4, if the DSP determines that user 54 is to receive a message on carrier frequency f, it will transmit that message on lead 23 (waveform 81) to the appropriate address in DPRAM 22 by indicating that address on lead 24 (waveform 82). A signal will also be sent on lead 25 to indicate a write mode (waveform 70) and on lead 27 to select the particular DPRAM shown (waveform 71). The data written into DPRAM 2,2 on data lead 23 will typically comprise 9 or more bits, with 8 bits being the message and the 9th bit being an instruction bit indicating that the message is to be transmitted to the TRX bus 40. (It will be noted by the indication of "X" in waveform 81 that meaningful data will be read into the DPRAM only when the write signal (waveform 70) and chip select signal (waveform 71) are present.)

It will be noted that the signals on lead 36 (waveform 73) and lead 37 (waveform 72) are always opposite in logic and will vary every time division multiplex frame (256 time slots) in order to prevent collisions between the TRX bus and the hopping DSP. That is, DSP 21 and decoder circuit 29 will always be addressing different portions of the memory at any particular time, and these portions will switch after each TRX frame.

At the same time slot in the next TRX frame (e.g., 2:55 of FIG. 3), the time generator and decoder circuit 29 will read out the message by sending a signal on the read lead 34 (waveform 74), chip select lead 35 (waveform 75) and the appropriate address on lead 32 (waveform 65). The time generator determines the address from the counter 55 which counts the signals from the waveform 64 of FIG. 3 derived from the clock signals on leads 43 and 44 thereby indicating the time slot due for transmission or reception. The stored message will appear on lead 30 (waveform 83), and the time generator and decoder circuit 29 will examine the 9th bit of the message, which appears on lead 31, a low value indicating that the message is to be transmitted to the TRX bus 40. Since the message is to be transmitted, the time generator will signal the buffer 28 according to waveforms 77 and 77a after examining the 9th bit so that the buffer will be put in a transmit mode to send the message onto lead 41 and to the TRX bus 40. Waveform 67 indicates when valid data (the absence of "X") appears on the lead 41.

Each transceiver, 50–53, will transmit messages only from designated time slots on the TRX bus. The message will, therefore, go to the appropriate transceiver according to the time slot initially designated by the hopper DSP. In this manner, the frequency to a particular user will vary by altering the transceiver which transmits to that user, recalling that each transceiver is fixed at a specific frequency.

A similar operation is performed when messages are received from a user, e.g., 54, as further illustrated in FIG. 3. The message will be received by the appropriate transceiver, 50–53, according to the carrier frequency for that broadcast frame. The message will be transmitted by the TRX bus 40 to buffer 28, which has been converted to a receive mode by the communication of time generator and decoder circuit 29 on leads 39 and 39a (waveforms 77 and 77a). Based on the time slot information the counter 55 generates from clock signals on leads 43 and 44, the counter will access the address corresponding to that time slot on lead 32 (waveform 65) so that the received message will be read into the DPRAM 22 on lead 30 and stored at the address corresponding to that time slot. In order to do this, the time generator and decoder circuit 29 will apply a signal (waveform 78) on lead 33 and a signal (waveform 75) on lead 35. During the same time slot in the next frame, the hopping DSP 21 will then read out the stored message on lead 23 by providing the address on lead 24, a read message (waveform 79 of FIG. 4) on lead 26, and a chip select signal on lead 27 (waveform 71). The message will then be transmitted to processing circuitry (not shown) coupled to the TDM bus 20.

As alluded to previously, the time generator and decoder circuit 29 through counter 55 also provides a page select feature in the memory by means of leads 36 and 37 and inverter 38. That is, the counter will generate 9 bits, the most significant bit appearing on lead 35 and through inverter 38 on lead 37, and the remaining 8 bits appearing on lead 32. Thus, the signals to one port will always be the inverse of the signal to the other port. For example, when it is desired to have the hopping DSP read or write into a block of 256 locations of the memory corresponding to the 256 time sloB, a "0" will be placed on lead 37 and a "1" on lead 36 (see waveforms 72 and 73 of FIG. 4) The logical "1" on lead 35 will ensure that the time generator and decoder circuit 29 cannot read or write the same locations at the same time (since a "1" added to the address from time generator and decoder circuit 29 will increase the address to greater than 256). Rather, the generator and decoder circuit 29 will read and write into a different block of 256 locations at that time. The signals on leads 36 and 37 will, therefore, change at the end of each TRX frame so that the blocks of memory available to the hopper and decoder will switch every frame. This feature ensures that there will be no collisions of data between the TRX bus and hopping DSP.

A further function performed by the time generator and decoder circuit 29 is to erase the instruction bit (9th bit) placed by the hopping DSP 21 in the DPRAM when the message was written in the memory. This is accomplished by the time generator and decoder circuit as soon as it reads out the message. During the first quarter of each time slot (e.g., 254), the decoder circuit will check to see what the 9th bit was in the previous time slot (e.g., 253). If the previous time slot indicated an output mode (a "0" for the 9th bit), the decoder circuit will write a "1" into the previous time slot address to clear the bit. If the previous time slot indicated an input mode (a "1"), nothing need be done. A new address will then be generated by the counter 55 (waveform 65). The decoder circuit will then read the 9th bit for the present time slot (e.g., 254) during the first quarter of the time slot. The remaining three quarters of the time slot can then be used for reading data into or writing data out of the memory 22. (Note, for example, that in time slot 254, data is being read out of the memory, and in the next time slot, 255, data is being read into the memory by the decoder circuit.)

Figure 5:
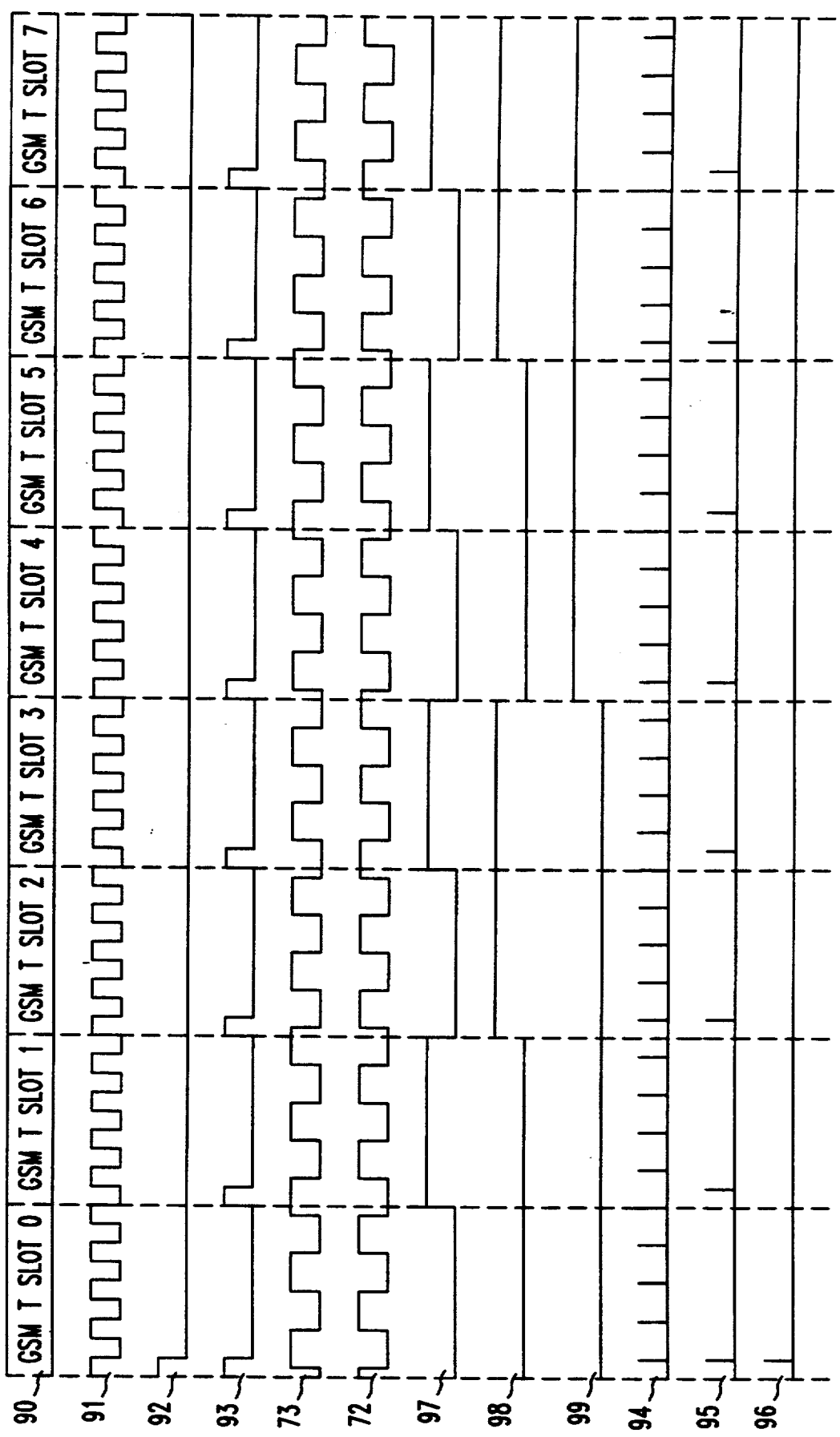

FIG. 5 illustrates the relationship between the broadcast frames of the transceivers (waveform 90) and the time division multiplexed flames of the TRX bus 40 (waveform 91). It will be noted that there are 4-½ TRX frames per broadcast time slot. Also shown are the signals supplied from the TRX bus 40 to the time generator and decoder circuit 29 over lead 58 (waveform 92) which indicate the start of a broadcast frame, and over lead 59 (waveform 93) to indicate the start of a broadcast time slot. The page select waveforms (72 and 73) are also included in FIG. 5 to illustrate how access to the memory is divided up between the time generator and decoder circuit 29 and the hopping DSP 21 during a broadcast frame.

Also, as shown in FIG. 5, the start of a TRX frame is indicated to the DSP 21 by the signals on lead 45 (waveform 94). The DSP is also notified of the start of a broadcast time slot on lead 46 (waveform 95) and the start of a broadcast frame on lead 47 (waveform 96). The broadcast time slot number is transmitted to DSP 21 on lead 48 which transmits 3 bits indicated by waveforms 97-99.

Various modifications of the invention will become apparent to those skilled in the art. All such variations which basically rely on the teachings through which the invention has advanced the art are properly considerable within the scope of the invention.

We claim:

1. A circuit for varying the carrier frequencies of transmission and reception of messages in a Time Division Multiple Access system comprising:
   means for determining the carrier frequency for transmission and reception of messages in a particular broadcast frame and for designating time slots for said messages according to the frequency;
   a bus for transmission and reception of said messages in said designated time slots in time division multiplexed frames;
   a dual port random access memory having one port coupled to the frequency determining means and the other port coupled to the bus so as to store therein said messages at locations corresponding to the designated time slots; and
   a plurality of transceivers coupled to the bus, each transceiver adapted to transmit and receive on a single carrier frequency messages assigned to specific time slots.

2. The circuit according to claim 1 further comprising a time generator and decoder for receiving clock signals from the bus and addressing the port of said memory coupled to the bus according to time slot information derived from said clock signals.

3. The circuit according to claim 2 wherein the time generator and decoder further comprises means for simultaneously applying bits of opposite polarity to address inputs of both ports of the memory in order to prevent collision of messages from the frequency determining means and from the bus.

4. The circuit according to claim 2 wherein each message stored in the memory includes an instruction bit, and the time generator and decoder further comprises means for erasing the bit after it is read out by the time generator and decoder.

5. The circuit according to claim 1 further comprising a buffer coupled between a port of the memory and the bus, the buffer being capable of being converted between a transmit mode and a receive mode.

6. The circuit according to claim 1 wherein the frequency determining means comprises a digital signal processor with means for calculating the carrier frequency and a table for matching the calculated frequency with a time slot.

* * * * *